3,239,556
PURIFICATION OF HYDROXYETHYL
TEREPHTHALATE
Robert D. Slockett, Woodbury, N.J., assignor to E. I. du Pont de Nemours and Company, Wilmington, Del., a corporation of Delaware
No Drawing. Filed Nov. 28, 1962, Ser. No. 240,707
4 Claims. (Cl. 260—475)

This application is a continuation-in-part of Serial No. 51,520, filed August 24, 1960, now abandoned.

This invention relates to a process for purifying bis($\beta$-hydroxyethyl) terephthalate.

Bis($\beta$-hydroxyethyl) terephthalate is used in the production of polyethylene terephthalate, an important polyester for the manufacture of fibers and films. One method of producing bis($\beta$-hydroxyethyl) terephthalate comprises reacting terephthalic acid with ethylene oxide in an aqueous medium and in the presence of the sodium salt of terephthalic acid at elevated temperature. The diester can be recovered by filtering off any solid material (unreacted terephthalic acid) from the hot mixture, and allowing the filtrate to cool, whereupon the diester crystallizes out. When terephthalic acid is prepared by the oxidation of a p-dialkyl benzene by nitric acid, the product contains nitro compound and aldehyde impurities. Further, when terephthalic acid containing such impurities is used to prepare bis($\beta$-hydroxyethyl) terephthalate, the same impurities are carried along into the diester product and have a deleterious effect on the polymer prepared therefrom. To be acceptable for many uses, polyethylene terephthalate must be white. However, the presence of even traces of nitro compounds and aldehydes in the diester from which the polymer is prepared causes the polymer to have an undesirable color and, in some cases, too low a viscosity as well. Thus, there is a great need for an effective process for removing such impurities from bis($\beta$-hydroxyethyl) terephthalate.

The procedures which have been developed in the past for removing such impurities generally have been unsatisfactory in one or both of the following respects: (1) the procedure does not prevent color from appearing in the polymer, and (2) the procedure entails considerable losses in yield of the diester. With respect to the appearance of color in the polymer prepared from the diester which has been treated for removal of nitro compounds and aldehydes, good color properties, i.e., a white polymer, are not necessarily assured by a procedure which merely reduces the content of these impurities to very small, even trace, amounts. That is, a trace amount of the impurities remaining in the purified diester is not the sole criterion of an effective purification. The purification procedure obviously must avoid the formation of new color-forming impurities which crystallize out with the diester.

I have found that nitro compound and aldehyde impurities are removed from an aqueous solution of bis($\beta$-hydroxyethyl) terephthalate without a deleterious effect on percent diester recovered and without introducing additional color-forming impurities in the diester by a process comprising (1) adjusting the pH of the solution to less than 7, (2) contacting said solution, at a temperature between about 40° C. and 160° C. with at least about 2%, by weight of the terephthalate, of a member selected from the class consisting of alkali metal bisulfites and sulfites, ammonium bisulfite, and ammonium sulfite, (3) cooling said solution to a temperature below about 40° to crystallize said purified terephthalate, (4) separating said crystallized purified terephthalate from said solution, (5) preparing an aqueous solution of said purified terephthalate and (6) contacting said solution with activated carbon. The purified terephthalate removed from this solution is essentially free of nitro compound and aldehyde impurities as well as from color-forming impurities which may have formed by reaction of the nitro compound and aldehyde impurities with the bisulfite or sulfite. As a result, the diester may be converted directly to polyethylene terephthalate of excellent color characteristics and viscosity. While I do not wish my invention to be limited in any way by theorization regarding the mechanism by which purification is effected, I believe that in the instant process the nitro compounds are converted to amine salts and the aldehydes to bisulfite addition products, and that the amine salts and aldehyde addition products are more soluble in water than is the diester, thereby remaining in solution as the diester crystallizes out.

The process of this invention offers the combined advantages of effective removal of color formers, and good product recovery. Generally, even on a large-scale basis, about 80% of the diester is recovered in the present process.

The advantages of the present process over prior art processes are achieved even without the final step of contacting a solution of purified diester with carbon. That is, the quality and yield of the diester obtained by contacting an aqueous solution of the impure product at a pH less than 7 with the bisulfite or sulfite are superior to the quality and yield of the diester obtained by the known prior art processes. However, on a practical basis, the final step of contacting with activated carbon is employed in the present process to achieve an even greater degree of product purity.

The present purification process is performed on a crude bis($\beta$-hydroxyethyl) terephthalate containing nitro compound and aldehyde impurities, said crude terephthalate being dissolved in an aqueous medium. Most commonly, the process will be applied to the reaction mixture obtained by the above-described reaction of terephthalic acid and ethylene oxide in the presence of sodium hydroxide, after any unreacted terephthalic acid has been filtered off. This mixture contains as the major components, crude bis($\beta$-hydroxyethyl) terephthalate (the solute), and water and ethylene glycol (solvents). The aqueous solution must be acidic, i.e, a pH of less than 7 is used. At pH 7 the percent of terephthalate recovered begins to show a significant drop, and above pH 7 the drop in recovery is marked. Preferably, the pH will not be significantly lower than 4, since below this value the product may become contaminated with small amounts of the half-ester, mono($\beta$-hydroxyethyl) terephthalate, which does not affect polymer color but which, even in small amounts, makes filtration difficult. The choice of the particular pH to be used will depend on the pH of the aqueous solution of the crude terephthalate as originally obtained and whether an adjustment of this pH is desired, e.g., to facilitate handling or processing of the mixture. Since in most cases the original solution of crude diester will be that obtained by the above-described reaction, and since the pH of this solution is approximately 5, the purification process of this invention usually will be effected on a solution having a pH of approximately 5. If desired, however, the solution may be made more or less acidic, but within the limits of less than 7 and not less than 4.

I have found that effective removal of nitro and aldehyde impurities from bis($\beta$-hydroxyethyl) terephthalate is achieved by the present process regardless of the concentration of the aqueous terephthalate solution used. While essentially complete removal of such impurities can be achieved from the terephthalate in solutions of very low concentration, e.g., 1–5% solutions, it is impractical to operate with such dilute solutions for economic reasons, and I therefore prefer to use solutions containing about 10 to 40% by weight of diester.

The aqueous solution of bis(β-hydroxyethyl) terephthalate of pH less than 7 is contacted with at least 2% (based on the weight of the diester) of an alkali metal bisulfite or sulfite, or ammonium bisulfite or sulfite. By alkali metal bisulfites and sulfites is meant sodium bisulfite, sodium sulfite, potassium bisulfite, potassium sulfite, lithium bisulfite, lithium sulfite, cesium bisulfite, cesium sulfite, rubidium bisulfite, and rubidium sulfite.

As is shown in the following examples, 2–3% by weight of the bisulfite or sulfite is sufficient to produce good results. However, for optimum results, the bisulfite or sulfite is used in an amount of about 7% to about 15% by weight of the terephthalate present in the solution. Amounts in excess of about 15% are generally unnecessary for optimum results.

The temperature at which the bisulfite or sulfite is in contact with the aqueous solution of the terephthalate can vary from about 40° C. to about 160° C. The bisulfite or sulfite can be added to the solution at any temperature in this range or below 40° C., at which some of the terephthalate may be crystallized out. If the addition is made at a temperature which is not the desired contacting temperature, the necessary temperature adjustment can be made after the addition. While temperatures at the lower end of the above-cited temperature range can be used in the present process, generally the rate of removal of the impurities is low, i.e., 1 to 2 hours are required, at the lower temperatures. Therefore, if a rapid rate of removal is desired, i.e., if a short contact time is desired, temperatures of at least about 100° C. are used. At temperatures of 130–160° C., effective impurity removal is achieved in approximately five minutes. Temperatures in excess of about 160° C. are not preferred, however, in that the product bis(β-hydroxyethyl) terephthalate, is degraded at these temperatures. Agitation is not required to effect essentially complete removal of the impurities, although the solution may be agitated, if desired.

After the aqueous terephthalate solution and the bisulfite or sulfite have been in contact for the required period of time, depending on the temperature used, the solution is cooled to crystallize the purified diester. The rate of cooling is not critical but the solution should be cooled to a temperature below about 40° C., preferably to about 25° C., to effect optimum crystallization. The purified diester then is separated from the solution in any conventional manner, e.g., by filtration, and dried to remove any adhering solution, which may contain dissolved color-producing impurities.

While the treatment of the aqueous terephthalate solution with bisulfite or sulfite removes approximately 99+% of the nitro compound and aldehyde impurities from the diester, as is shown in the following examples, to assure that a white polymer will be obtained from the diester, an aqueous solution of the purified diester is prepared, and the solution contacted with activated carbon. While activated carbon can be added to the diester solution prior to the crystallization of the diester, treatment with carbon is more effective if the diester is crystallized and separated as described above, and a second solution prepared for treatment with activated carbon. The concentration of this second solution is similarly not critical but for economic reasons a concentration of at least about 25% is preferred. At least about 1%, based on the solution weight, of activated carbon provides good results while an amount in excess of about 10% is usually not necessary. Regenerated carbon, i.e., used carbon which has been calcined at elevated temperatures, may be used.

The manner in which the terephthalate solution is contacted with activated carbon is not critical and may be effected by any convenient means. For example, the carbon may be added to the solution in powdered form, or may be added to the aqueous solvent prior to or essentially simultaneously with the diester. Alternatively, the diester solution may be passed through a bed of activated carbon, e.g., in a column.

During the treatment with carbon, the solution is maintained at a temperature of at least about 60° C., preferably 75° C., to assure that all of the diester is completely dissolved. The activated carbon treatment may be conducted over any period of time, but at least 0.5 hour should be provided in order to accomplish good results. After treatment with activated carbon, the solution is separated from the carbon and cooled to below about 40° C., preferably 25° C., to crystallize out the bis(β-hydroxyethyl) terephthalate. The latter is then recovered by filtration, washing, and drying in any conventional manner. Obviously, cold water is preferred for any washing procedures. The pH of the solution contacted with carbon should not go beyond the range specified for the solution treated with bisulfite or sulfite.

The activated carbon used in the present process is a high-surface-area material which is commonly known as activated carbon or activated charcoal. The total surface area of such an activated carbon generally ranges from $2 \times 10^4$ to $6 \times 10^4$ sq.cm. per g. The carbon is generally prepared by carbonizing coal, wood, peat, cellulose waste, bones, coconut shells, corn cobs or the like to produce a carbon which is then crushed to the desired size, following which the crushed material is activated by heating to an elevated temperature in an atmosphere of steam, carbon dioxide, etc. until the desired activity has been attained. Any one of the activated carbons sold commercially for decolorizing purposes may be used. For example, type SGL granular carbon sold by the Pittsburgh Coke & Chemical Co. is suitable for column operation, and was utilized in Example 5; and type RB pulverized carbon, sold by the same company, is suitable for batch-wise operation and was used in the remaining examples.

The following examples illustrate specific embodiments of the process of the present invention.

*Example 1*

Bis (β-hydroxyethyl) terephthalate is prepared by the reaction, at 100° C. for 45 minutes, of 5.5 moles of ethylene oxide, 3 moles of terephthalic acid, and 0.5 mole of sodium hydroxide in 37 moles of water. The reaction mixture is filtered while hot (70° C.) to remove unreacted terephthalic acid. The filtrate weighs 2500 grams, has a pH of 5, and contains 20% by weight of the diester, 70% by weight of water, and 10% by weight of ethylene glycol. The amount of nitro compound and aldehyde impurities present, based on the weight of the diester, is 1.5%. To this 20% solution of crude bis(β-hydroxyethyl) terephthalate is added 12%, based on diester weight, of sodium bisulfite, and the solution is heated to 130° C. and maintained at that temperature for 5 minutes, after which it is cooled to 25° C. to crystallize out the bis(β-hydroxyethyl) terephthalate. The latter is filtered off, dried and weighed. The filter cake weighs 423 grams, indicating that 77% of the diester has been recovered. The cake is white in color. A portion of the filter cake is analyzed to contain 45 p.p.m. of aldehyde and nitro compound impurities (45 parts of aldehydes and nitro compounds per million parts of diester).

The remainder of the filter cake is dissolved in water to form a 20% solution, and 1.7% of powdered, activated carbon (based on solution weight) is added to the solution. The latter is maintained at a temperature of 75° C. for 0.5 hour after which the carbon is removed by hot filtration. The solution is cooled to 25° C. and the crystallized bis(β-hydroxyethyl) terephthalate is then filtered, washed with water, and dried. The dried bis (β-hydroxyethyl) terephthalate is white and contains less than 10 p.p.m. of nitro compound and aldehyde impurities. The diester recovery is 73%.

As a conclusive test of purity, and to show that no color-forming impurities have been introduced into the diester by the purification treatment, the diester is converted to polyethylene terephthalate by heating in a glass tube of 3 hours at 285° C. under a pressure of less than 1 mm. of Hg, using a solution of antimony trioxide as a catalyst. The polymer has excellent viscosity and a polymer color standard of 1 as used in accordance with A.S.T.M. Standard Method D-848-47.

Similar results are obtained when potassium sulfite, potassium bisulfite, ammonium sulfite, ammonium bisulfite, lithium sulfite, cesium sulfite, or rubidium sulfite is substituted for the sodium bisulfite in this example.

In contrast to these results, when a procedure described in the prior art employing sodium hyposulfite is used on the crude bis ($\beta$-hydroxyethyl) terephthalate, the diester is peach-colored, and, after one treatment with carbon, contains 169 p.p.m. of aldehydes and nitro compounds. Polymer obtained from this product has a color standard of 7 or 8. After two carbon treatments, the impurity content drops to 5 p.p.m., but the polymer color is 9 or 10, much too high for fibers and films.

*Example II*

The process of Example I is repeated except that the sodium bisulfite treatment is conducted at 160° C. The bis($\beta$-hydroxyethyl) terephthalate thus treated is equal in quality to that treated as described in Example I.

*Example III*

Bis($\beta$-hydroxyethyl) terephthalate is prepared by the reaction described in Example I. Bis($\beta$-hydroxyethyl) terephthalate is separated from the filtrate remaining after the removal of terephthalic acid by cooling the filtrate to 25° C., filtering at 25° C., slurrying the filter cake in water, and filtering the slurry at 25° C. The filter cake is dried, and found to contain 1.5% of aldehyde and nitro compound impurities. The filter cake weighs 423 grams and is tan in color. Polymer made from bis($\beta$-hydroxyethyl) terephthalate having this nitro compound and aldehyde content is a black, lumpy, opaque solid.

The bis($\beta$-hydroxyethyl) terephthalate filter cake is dissolved in water sufficient to form a 20% solution. The pH of the solution is 5, and is increased to 6.5 by the addition of a 7% aqueous solution of sodium bicarbonate. To this solution is added 7%, by weight of the terephthalate, of sodium bisulfite, and the resulting solution is heated to a temperature of 75° C. After 2 hours, the solution is cooled to 25° C. and the crystallized diester is filtered off and dried. The filter cake weighs 381 grams, indicating a 76% recovery of the diester. The cake, which is white in color, is analyzed and found to contain 0.02% by weight of the aldehyde and nitro compound impurities.

The purified bis($\beta$-hydroxyethyl) terephthalate (381 grams) is then dissolved in water to form a 20% aqueous solution. The solution is heated to 75° C. and powdered activated carbon (7%, based on the solution weight) is added. After stirring for 0.5 hour, the carbon is filtered from the slurry at 75° C. and the filtrate is cooled to 25° C. to crystallize out the bis($\beta$-hydroxyethyl) terephthalate. The latter is then recovered by filtering at 25° C., washing the resulting cake with cold water, and drying in a conventional manner. The cake weighs 366 g., indicating a 73% recovery. The thus-purified diester contains 38 p.p.m. of aldehyde and nitro compound impurities.

When polymerized by the method described in Example I, the purified diester gives a pure-white polymer having excellent viscosity and a polymer color standard of 1 as used in accordance with A.S.T.M. Standard Method D-848-47.

*Example IV*

The procedure of Example III is repeated except that the crude diester contains 1.45% impurities, and the amount of sodium bisulfite added is 2.75%, based on the weight of the terephthalate. 77% of the diester is recovered after the bisulfite treatment, and the nitro compound and aldehyde content is reduced to 77 p.p.m. After treatment of a 20% aqueous solution of the bisulfite-treated diester with 4.5%, based on the solution weight, of powdered activated carbon as described in the previous example, the diester contains less than 5 p.p.m. of aldehyde and nitro compound impurities. The color standard of polyethylene terephthalate prepared from this material is less than 1.

*Example V*

Bis($\beta$-hydroxyethyl) terephthalate is prepared as described in Example I, and a 20% aqueous solution thereof is prepared. To this solution is added 3%, based on the amount of bis($\beta$-hydroxyethyl) terephthalate, of sodium bisulfite in addition to recycled filtrate from a previous similar crystallization which contains 4% sodium bisulfite based on the amount of bis($\beta$-hydroxyethyl) terephthalate present. This solution is then held at 75° C. for 1 hour after which it is cooled to 25° C. to crystallize out the bis($\beta$-hydroxyethyl) terephthalate. After filtering at 25° C., the bis($\beta$-hydroxyethyl) terephthalate filter cake is washed with cold water and dissolved in water at 75° C. to make a 15% solution. This solution is passed at 75° C. through a char-packed column 4 feet high at a flow rate of 66 gallons per hour per square foot of bed area. The bis($\beta$-hydroxyethyl) terephthalate is recovered by cooling the resultant solution to 25° C., filtering it, and washing and drying the filter cake.

The bis($\beta$-hydroxyethyl) terephthalate thus treated is analyzed and found to contain 21 parts per million of impurities. The polyethylene terephthalate prepared from it has a polymer color of 1 and an excellent viscosity.

*Example VI*

A 20% aqueous solution of bis($\beta$-hydroxyethyl) terephthalate is prepared as described in Example III. The pH of the solution is 5. To this solution is added 14%, by weight of the terephthalate, of sodium sulfite, and the resulting solution is heated to a temperature of 75° C. After 1.5 hours, the solution is cooled and filtered at 25° C. A 20% aqueous solution of the crystallized bis($\beta$-hydroxyethyl) terephthalate is then treated with 2% powdered, activated carbon (based on the solution weight). This solution is held at 75° C. for 0.5 hour, after which the carbon is removed by filtration. The solution is then cooled to 25° C. and the crystallized bis($\beta$-hydroxyethyl) terephthalate is filtered off and washed with water. The dried diester is analyzed to contain 12 parts per million of aldehyde and nitro compound impurities. The polyethylene terephthalate prepared as in Example I has a color standard of 1 and excellent viscosity.

The following example shows the adverse effect on yield produced by pH 7 or higher.

*Example VII*

(a) Three-hundred milliliters of crude bis($\beta$-hydroxyethyl) terephthalate solution obtained as described in Example I, after filtration of unreacted terephthalic acid and containing 83.2 grams of the diester, is held at 75° C. for 2 hours after the addition of four grams of sodium bisulfite in 50 milliliters of water. The pH of the solution is 4. The solution is cooled to 25° C., and the crystallized diester filtered off and dried. The amount of solids obtained is 70.4 grams, of which 91.4% is bis($\beta$-hydroxyethyl) terephthalate. Thus, 77.3% of the diester is recovered.

(b) Procedure (a) is repeated except that 33 milliliters of 6.9% aqueous sodium bicarbonate also is added to the solution to produce a pH of 7. The amount of solids obtained is 67.6 grams containing 90.4% of the diester, i.e., a 73.3% recovery. Thus, the addition of base just to the neutralization point results in a significant loss in yield.

(c) While the present process employs only solutions having a pH less than 7, the adverse effect of pH's above 7 is seen in the procedures taught by the prior art. Use of such procedures at the pH taught, i.e., pH 8.5, results in only a 56% recovery of diester.

I claim:

1. A process for removing aldehyde and nitro impurities from bis($\beta$-hydroxyethyl) terephthalate which comprises:
   (a) contacting an aqueous solution of crude bis($\beta$-hydroxyethyl) terephthalate at a temperature between about 40° C. and 160° C. and a pH of less than 7 with at least about 2%, based on the weight of the terephthalate, of a member of the group consisting of alkali metal bisulfites and sulfites, ammonium bisulfite and ammonium sulfite;
   (b) cooling said solution to a temperature below about 40° C. to crystallize purified bis($\beta$-hydroxyethyl) terephthalate from said solution; and
   (c) separating said crystallized purified bis($\beta$-hydroxyethyl) terephthalate from said solution.

2. A process for removing aldehyde and nitro impurities from crude bis($\beta$-hydroxyethyl) terephthalate which comprises:
   (a) contacting an aqueous solution of crude bis($\beta$-hydroxyethyl) terephthalate at a temperature between about 40° C. and 160° C. and a pH of at least 4, but less than 7, with at least about 2%, based on the weight of the terephthalate, of a member of the group consisting of alkali metal bisulfites and sulfites, ammonium bisulfite and ammonium sulfite;
   (b) cooling said solution to a temperature below about 40° C. to crystallize purified bis($\beta$-hydroxyethyl) terephthalate from said solution;
   (c) separating said crystallized purified bis($\beta$-hydroxyethyl) terephthalate from said solution;
   (d) preparing an aqueous solution of said purified bis($\beta$-hydroxyethyl) terephthalate; and
   (e) contacting said solution with activated carbon.

3. A process of claim 2 wherein said solution of crude bis($\beta$-hydroxyethyl) terephthalate is contacted with sodium bisulfite.

4. A process of claim 3 wherein said solution of crude bis($\beta$-hydroxyethyl) terephthalate is contacted with said sodium bisulfite at a pH of about 5.

References Cited by the Examiner
UNITED STATES PATENTS

| 1,905,974 | 4/1933 | Livingston | 260—475 |
| 3,058,997 | 10/1962 | Taylor et al. | 260—475 X |

FOREIGN PATENTS

| 149,464 | 12/1952 | Australia. |
| 1,145,990 | 5/1957 | France. |
| 760,027 | 10/1956 | Great Britain. |

References Cited by the Applicant
FOREIGN PATENTS

| 524,440 | 5/1956 | Canada. |

LORRAINE A. WEINBERGER, *Primary Examiner.*

LEON ZITVER, *Examiner.*